(12) United States Patent
Kukuk et al.

(10) Patent No.: US 8,073,221 B2
(45) Date of Patent: Dec. 6, 2011

(54) SYSTEM FOR THREE-DIMENSIONAL MEDICAL INSTRUMENT NAVIGATION

(76) Inventors: Markus Kukuk, Palo Alto, CA (US); Sandy Napel, Menlo Park, CA (US)

( * ) Notice: Subject to any disclaimer, the term of this patent is extended or adjusted under 35 U.S.C. 154(b) by 445 days.

(21) Appl. No.: 12/464,163

(22) Filed: May 12, 2009

(65) Prior Publication Data

US 2009/0279767 A1    Nov. 12, 2009

Related U.S. Application Data

(60) Provisional application No. 61/052,312, filed on May 12, 2008.

(51) Int. Cl.
G06K 9/00 (2006.01)
H05G 1/64 (2006.01)
(52) U.S. Cl. ............. 382/128; 382/132; 378/4; 600/407
(58) Field of Classification Search .......... 382/128–154; 348/47; 600/407; 378/4, 98.2
See application file for complete search history.

(56) References Cited

U.S. PATENT DOCUMENTS

| | | | |
|---|---|---|---|
| 6,351,513 B1 | 2/2002 | Bani-Hashemi et al. | |
| 6,389,104 B1 | 5/2002 | Bani-Hashemi et al. | |
| 7,991,105 B2 * | 8/2011 | Mielekamp et al. | 378/4 |
| 8,019,135 B2 * | 9/2011 | Quist | 382/128 |
| 2003/0181809 A1 | 9/2003 | Hall et al. | |
| 2006/0023840 A1 * | 2/2006 | Boese | 378/98.12 |
| 2007/0116342 A1 * | 5/2007 | Zarkh et al. | 382/130 |
| 2008/0009715 A1 | 1/2008 | Kukuk et al. | |
| 2008/0085034 A1 * | 4/2008 | Hildebrandt et al. | 382/107 |
| 2008/0194945 A1 | 8/2008 | Kukuk et al. | |
| 2008/0200876 A1 | 8/2008 | Kukuk et al. | |
| 2009/0207965 A1 * | 8/2009 | Sakaguchi | 378/4 |
| 2010/0201786 A1 * | 8/2010 | Schaefer et al. | 348/47 |
| 2010/0208973 A1 * | 8/2010 | Lienard et al. | 382/132 |
| 2010/0296623 A1 * | 11/2010 | Mielekamp et al. | 378/4 |

OTHER PUBLICATIONS

Baert et al., "Three-Dimensional Guide-Wire Reconstruction from Biplane Image Sequences . . . ," IEEE Transactions on Medical Imaging, vol. 22, No. 10, Oct. 2003.
Van Walsum, Baert and Niessen, "3D guide wire visualization in 3DRA using monoplane flurorscopic imaging," 2003.
Baert, Viergever, Niessen, Guide-Wire Tracking During Endovascular Interventions, IEEE Transactions on Medical Imaging, vol. 22, No. 8, Aug. 2003.
Van Walsum et al., "Guide Wire Reconstruction and Visualization in 3DRA Using Monoplane Fluroscopic Image," IEEE Transactions on Medical Imaging, vol. 22, No. 5, May 2005.

* cited by examiner

*Primary Examiner* — Hoa Pham
(74) *Attorney, Agent, or Firm* — Alexander J Burke

(57) ABSTRACT

A system and method are disclosed for reconstructing an instrument in 3 dimensions for use during interventional medical procedures to provide enhanced instrument visualization with respect to a patient's vasculature. A patient vessel tree volume is co-registered with a live fluoroscopic image of a percutaneously-inserted instrument, such as a guidewire. The fluoroscopic image is segmented to eliminate images of surrounding tissue and to retain the guidewire image. The black pixels of the image are backprojected to the focal point of the x-ray source, through the co-registered vessel tree. The vessel tree is divided into segments that are scored based on proximity to the backprojected black pixels. Candidate instrument-containing vessel paths are identified based on the scores of the segments, and errant candidate vessel paths are eliminated to produce a refined list of candidate paths. Thresholding and visualization are performed to further refine the candidate vessel paths. 3D curve fitting is used to reconstruct an image of the instrument along with a 3D rendering of the final vessel path.

32 Claims, 12 Drawing Sheets

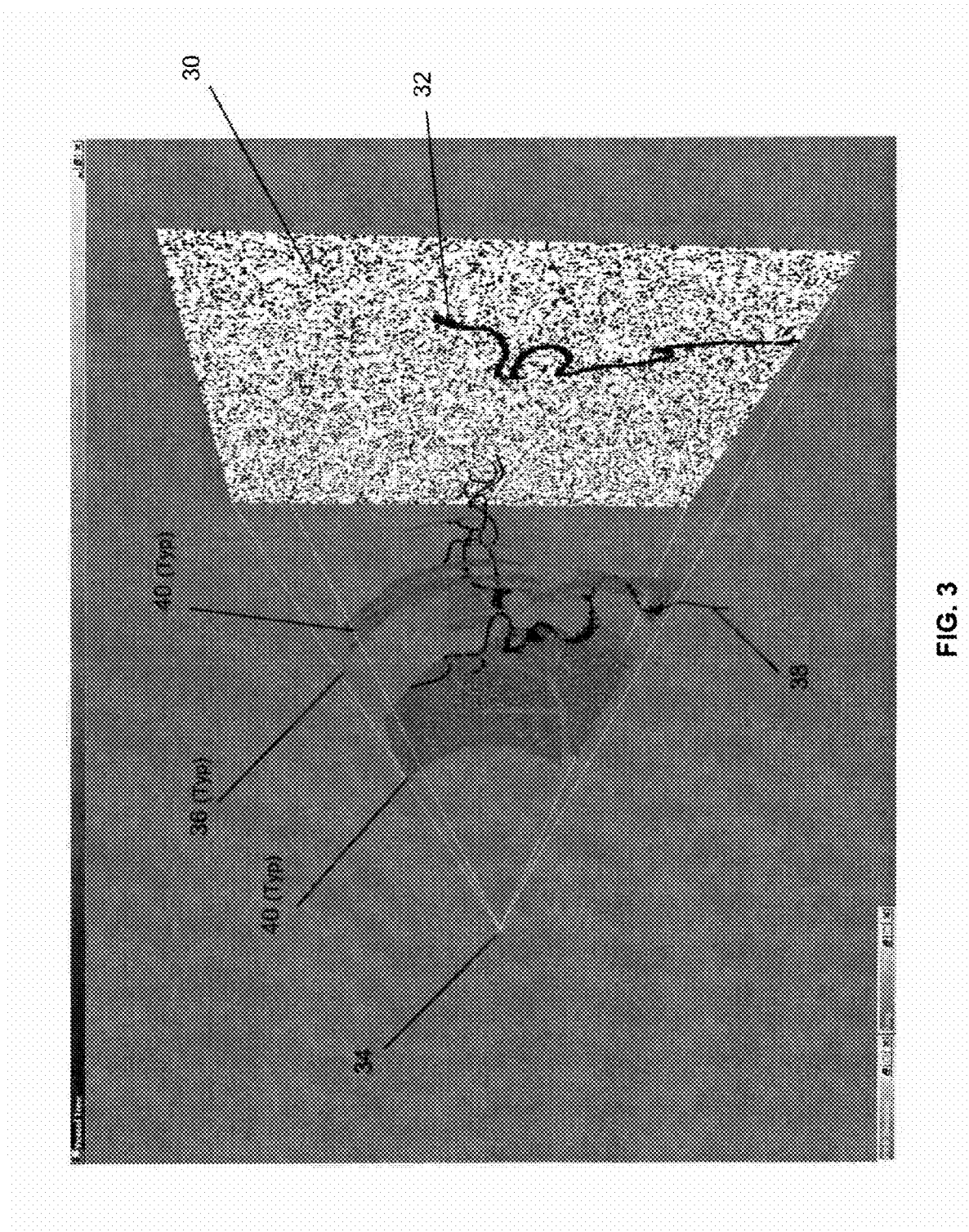

SYSTEM FOR THREE-DIMENSIONAL MEDICAL INSTRUMENT NAVIGATION

CROSS-REFERENCE TO RELATED APPLICATIONS

This is a non-provisional application of U.S. provisional patent application Ser. No. 61/052,312 filed May 12, 2008 by Markus Kukuk et al.

FIELD OF THE DISCLOSURE

The disclosure is related to roadmapping procedures in general, and more particularly to procedures for enhanced visualization of guidewire placement within patient blood vessels.

BACKGROUND

The process known as road-mapping is used in the selective catheterization of vessels in the framework of an interventional treatment. In these minimally invasive angiographic interventions, a 3-dimensional (3D) image of a patient's vasculature is obtained for use as a "road-map," to assist a physician to efficiently guide or navigate instruments such as catheters or guide-wires through the patient's vasculature. Intravascular procedures are often performed using a C-arm x-ray imaging system which includes an adjustable x-ray source and an x-ray detector.

Image based navigation using road-mapping processes utilize three types of images: vessel images (3D road map of patient's vasculature), fluoroscopy images and navigation images. The vessel images are acquired by injecting a contrast agent into the blood stream during x-ray acquisition to visualize the patient's vasculature. This image is retained as a "road map" image. Fluoroscopic images are later acquired without the injection of a contrast agent and typically depict dense structures such as bones and instruments. The navigation image is computed by combining the vessel image with the fluoroscopy image to visualize the live instruments in the context of the previously-imaged vasculature. Road mapping processes find application in both two-dimensional (2D) and 3D image based navigation processes.

In 2D image processing applications, a series of vessel images is acquired by injecting contrast agent into the blood to opacify the vessel tree during image acquisition. A C-arm (on which an x-ray source is mounted) is kept stationary during the acquisition. One vessel image is selected to serve as a so-called "road map". Navigation images are created by combining the single road map image with subsequent live fluoroscopic images for guiding instrumentation (e.g., guide wires, catheters) throughout the vasculature, in real-time.

In 3D image processing applications, contrast agent is injected to opacify the vessels, during which a C-arm is rotated on a circular trajectory around the patient. In this way a series of images are acquired that depict the vasculature from a different angle. In a subsequent processing step, the acquired images are sent to a reconstruction unit, where a 3D image (referred to as a "volume") of the vessel tree is computed. This 3D image is retained and serves as the vessel image of the 3D road-mapping process. A 2D vessel image showing the vasculature from any angle can be obtained by re-projecting the 3D vessel image and displaying it on a graphical display. Similar to the 2D road-mapping process, this re-projected 2D vessel image is combined with subsequent live fluoroscopic images to obtain the navigation image. Due to vessel self-occlusion and blending that can occur when overlaying two 2D images, however, desired depth cues, such as highlights and shadows are often diminished, leaving the user with an image that provides limited depth perception.

If a guidewire could be "reconstructed" in 3D from a single fluoroscopic image, visualization of the guidewire position within a vessel tree can be improved. For example, 3D depth cues could be preserved by rendering the vessel tree transparent and showing the 3D guidewire inside. Also, vessels not relevant to the instant navigation task could be "pruned," (i.e., eliminated from the rendering), thereby reducing self-occlusion and enhancing the overall image. Furthermore, a working view could be adjusted without adjusting the C-arm.

Thus, there is a need for an improved system and method for guidewire reconstruction in 3D for use during interventional medical procedures that are more advanced than current 2D imaging methods, and that provide enhanced guidewire visualization with respect to a patient's vasculature.

SUMMARY OF THE DISCLOSURE

A method is disclosed for constructing an image showing a percutaneous instrument in three dimensions for use in an imaging system. The method comprises: processing data representing an x-ray image to remove image data representing patient tissue from the x-ray image to provide processed x-ray image data representing an image of the instrument; and identifying candidate vessel segments representing locations within a patient vessel tree that are candidates for containing a tip of the percutaneous instrument based on deriving a score for individual segments of a plurality of vessel segments within a vessel path of the vessel tree; wherein the step of deriving a score comprises projecting a ray from a pixel of the processed x-ray image data to a focal point of an x-ray source, the score based on a distance from the ray to the individual segments.

A system is disclosed for locating a percutaneous instrument in three dimensional image representative data for use in a system comprising an imaging system having a movable arm, an x-ray source and an x-ray detector and a display and a system controller connected to and in communication with the imaging system and display, and a machine-readable storage medium encoded with a computer program code such that, when the computer program code is executed by a processor, the processor performs a method. The method comprises: processing data representing an x-ray image to remove image data representing patient tissue from the x-ray image to provide processed x-ray image data representing an image of the instrument; and identifying candidate vessel segments representing locations within a patient vessel tree that are candidates for containing a tip of the percutaneous instrument based on deriving a score for individual segments of a plurality of vessel segments within a vessel path of the vessel tree; wherein the step of deriving a score comprises projecting a ray from a pixel of the processed x-ray image data to a focal point of an x-ray source, the score based on a distance from the ray to the individual segments.

BRIEF DESCRIPTION OF THE DRAWINGS

The accompanying drawings illustrate preferred embodiments of the disclosed method so far devised for the practical application of the principles thereof, and in which:

FIG. 3 is a representation of a 3D vessel tree, a 2D fluoroscopic view containing an instrument, a 3D representation of a vessel tree segment, and a backprojection of 2D black pixels onto the 3D vessel tree;

DETAILED DESCRIPTION

Definitions

Figure 1:
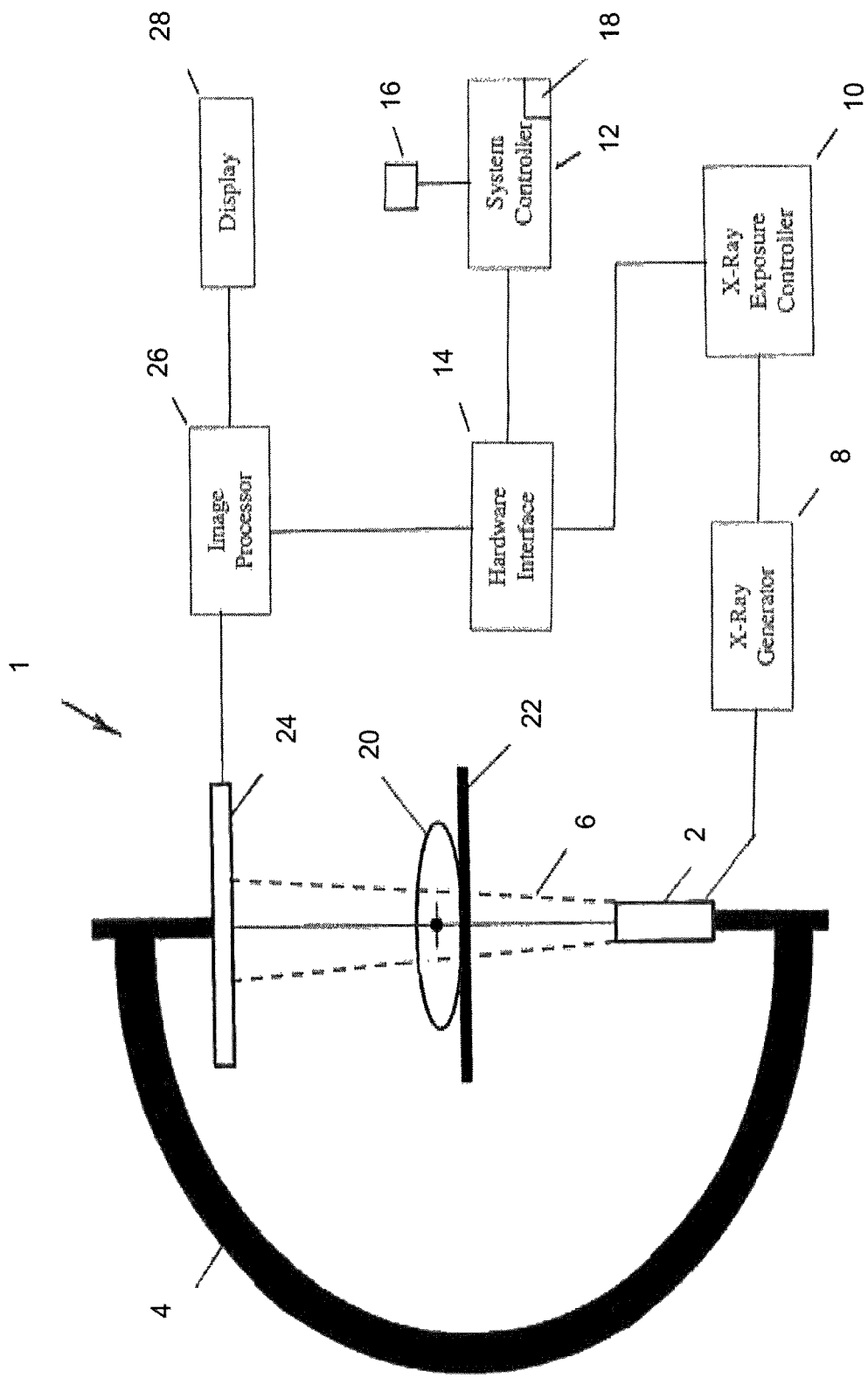
FIG. 1 is a schematic diagram showing an exemplary X-ray imaging system for use with the disclosed method.

An angiogram uses a radiopaque substance (i.e., a contrast agent) to make blood vessels visible under x-ray imaging. A roadmapping mask is a digitally subtracted angiogram generated by computer processes which compare an x-ray image of a region of the body before and after a contrast agent has been injected arterially into the body. A fluoroscopic image is an x-ray image showing internal tissues of a region of the body. A live fluoroscopic image is an x-ray image showing live movement of internal tissues of a region of the body. A superimposed image is an image in which an original or adjusted roadmapping mask is combined with a live fluoroscopic image. "Combining" a roadmap mask with live fluoroscopy is achieved by digitally subtracting the adjusted mask in real time from the live fluoroscopic image. Since the mask contains a representation of the contrast media (i.e., the blood vessels) and the live fluoroscopic image does not, the contrast media shows up as white while the guide wire, catheter, or other medical device being guided under fluoroscopy shows up as a dark image on top of the white vessels. It will be appreciated that other processes for combining a roadmapping mask and a live fluoroscopic image can be used to achieve a similar image. For example, a vessel map can be extracted from the roadmapping mask and superimposed over a live fluoroscopic image. "Co-registering" or "calibrating" means aligning an x-ray image with a patient 3-dimensional image data set such that associated features within the x-ray image and a two-dimensional overlay image generated from the patient 3-dimensional image data set appear at the same location on a display in which the x-ray image and the overlay image are shown together. Co-registration can be point-based (i.e., landmark-based) co-registration can be used in which a transform is applied to the 3-dimensional image data set such that points in the resulting overlay image line up with their counterparts in the x-ray image as closely as possible. Gray-level based co-registration processes can also be used determine the transform not by minimizing the distance between associated points in the overlay image and x-ray image, but by minimizing an error metric based on the resulting overlay image's gray levels and the x-ray image's gray levels.

Backprojecting a 2D fluoroscopic image is a process by which a pixel in the 2D image is connected by an imaginary line (termed a "ray") in 3D space to the origin of the source of radiation. The lines (corresponding to a plurality of pixels) transect a 3D grid positioned in the geometry defined by the origin of the source of radiation and the detector that produced the fluoroscopic image. The intersecting grid points with lines are assigned a value associated with the value of the corresponding pixel on the 2D image. A digitally reconstructed radiograph is the simulation of an x-ray image reconstructed from a 3D data set, where the values at grid points in the 3D data set that lie on a line connecting the origin of the source of radiation to a pixel in the 2D image are summed to form the value of the pixel. An instrument refers to an object which is insertable into the tissue of a patient, a non-limiting listing of which include guidewires, catheters, cannula, endoscopes, needles and other biopsy devices, screws, implants, and anything else that can be inserted into a patient's body either percutaneously or intravascularly A system and method are disclosed for reconstructing an image of an instrument (e.g., guidewire) using a volumetric data set that represents a vessel tree and a single fluoroscopic view of the guidewire. In the disclosed system and method, fluoro-mask subtraction is performed on multiple successive fluoroscopic images to provide an enhanced image of an instrument inserted into the patient's vasculature. The subtraction procedures eliminate background features (e.g., bone tissue, soft tissue), while leaving the instrument visible and well defined. Although the resulting image is noisy, as will be described in greater detail later the process is not sensitive to noise. The resulting subtracted instrument image is binarized using a simple threshold. The threshold value is not critical and the process works for a relatively large range of threshold values. The threshold value needs to be high enough that the instrument is completely shown in the resulting image, and low enough that the number of black pixels (i.e., those representing the instrument) is minimized so as to minimize overall computation time.

The 3D vessel tree is divided up into a multiplicity of individual segments. Individual black pixels of the subtracted fluoroscopic image are back-projected along a ray that converges on the x-ray focal point of the x-ray source. Since the 3D vessel tree and the subtracted fluoroscopic image are registered to the patient, the system determines a "score" for the vessel segments based on the number or proximity of rays that pass within a certain distance of the segment. Since the greatest number/density of black pixels is associated with the instrument, backprojection of the instrument pixels results in a relatively high score for those segments that are near to or intersected by the rays related to the instrument pixels.

One or more individual vessel branches are identified as having the highest total "score" (based on the scores of the individual segments that make up those branches). These individual vessel branches are considered as being potential candidates for containing the instrument, and are individually rendered and shown to the user on a display device. Based on the displayed rendering, as well as an understanding of the instrument position at that point in the procedure, the user decides which of the vessel branches contains the wire. Alternatively, the system automatically further refines the list of candidates and identify the single branch that contains the instrument.

In additional embodiments, the system reconstructs the instrument using curve fitting and displays the instrument in the context of the rendered 3D vessel tree to provide the user with a high contrast image that represents the position of the instrument inside the patient's vasculature.

The disclosed system and method enable enhanced visualization of the position of an instrument within a patient. In one embodiment, the instrument is not constrained to the centerline of a particular vessel (in contrast to known systems), and thus, the instrument can appear outside of the 3D vessel image, as is often the case when a vessel is straightened by a relatively stiff instrument such that the vessel no longer corresponds to the previously acquired 3D vessel image.

Referring now to FIG. 1, an exemplary X-ray system 1 comprises an x-ray tube or source 2 and associated support and filtering components. The X-ray source is affixed to a support, such as a C-arm fluoroscope stand 4 which allows the X-ray source to be moved within a constrained region. The constrained region is arcuate or otherwise three dimensional, depending on the nature of the support structure. A collimator is also included, which will define the size and shape of X-ray beam 6 emerging from the source.

An X-ray generator 8, x-ray exposure controller 10, and system controller 12 is also included. In one embodiment, system controller 12 is a personal computer or controller capable of receiving and transmitting control signals to/from the above-described X-ray system components via a hardware interface 14. System controller 12 includes a user input device 16, such as a trackball, mouse, joystick, and/or computer keyboard to provide for user input in carrying out various system functions, such as mode selection, linearity control, X-ray dose control, data storage, etc. The system controller 12 includes a processor 18 executing instructions for performing one or more steps of the disclosed process.

In the illustrated embodiment, a patient 20 is shown supported on patient-support table 22 so that a generated X-ray beam 6 passes through the patient onto a detector 24, located on the C-arm 4 opposite the X-ray source 2. In one embodiment the detector 24 is a flat panel detector that acquires digital image frames directly, which are transferred to an image processor 26. A display/record device 28 records and/displays the processed image(s), e.g., subtracted angiography images. The display/record device 28 includes a display for displaying the displayed image output, as well as a separate device for archiving. The image is arranged for storage in an archive such as a network storage device.

The positions of the movable components of the system (e.g., x-ray source 2, C-arm 4, patient table 22, x-ray detector 24), are determined using individual motor controllers associated with the equipment. When the system 1 is initially set up, the relative positions of the movable components are calibrated so that the positions programmed into the motor controllers enable the accurate positioning of the components relative to one another. The X-ray source 2 is controlled by the system controller 12 via exposure controller 10 and X-ray generator 8.

The method will now be described in greater detail, with reference to FIGS. 2A-7. The method is divided into three sections. In Section I, candidate vessel segments are identified as potentially containing the instrument. In Section II, thresholding is applied to more tightly define the candidate vessel segments and to provide a visual representation of those candidate segments. In Section III, the instrument is reconstructed for display in 3D along with the vessel segment in which the instrument is contained.

Section I—Identifying the Vessel Segment that Contains the Wire

A 3-dimensional image data set of a targeted patient vessel tree is provided, using CT, DynaCT, or other appropriate acquisition process. The vessel tree comprises a plurality of vessel paths. Intrinsic and extrinsic projection geometry (e.g., focal length, pixel size) of the x-ray source 2 are also provided. An x-ray image (e.g., a live fluoroscopic image) of a patient tissue region is obtained using the x-ray source 2 and x-ray detector 24. The patient tissue region contains the instrument 32 positioned within a portion of the targeted vessel tree. The 3-dimensional image data set is co-registered or calibrated to the x-ray image acquired using the x-ray source 2 and x-ray detector 24. If the vessel tree volume is a C-arm CT image, acquired with the C-arm system (e.g., DynaCT), a one-time calibration is performed to align the vessel tree volume and the live fluoroscopic image. In cases in which the vessel tree volume is obtained by a conventional CT or MR processes, a variety of 2D-to-3D registration methods can be used to co-register the two images. For example, point-based (i.e., landmark-based) co-registration can be used in which a transform is applied to the 3-dimensional image data set such that points in the resulting overlay image line up with their counterparts in the x-ray image as closely as possible. Gray-level based co-registration processes can also be used determine the transform not by minimizing the distance between associated points in the overlay image and x-ray image, but by minimizing an error metric based on the resulting overlay image's gray levels and the x-ray image's gray levels.

Figure 2A:
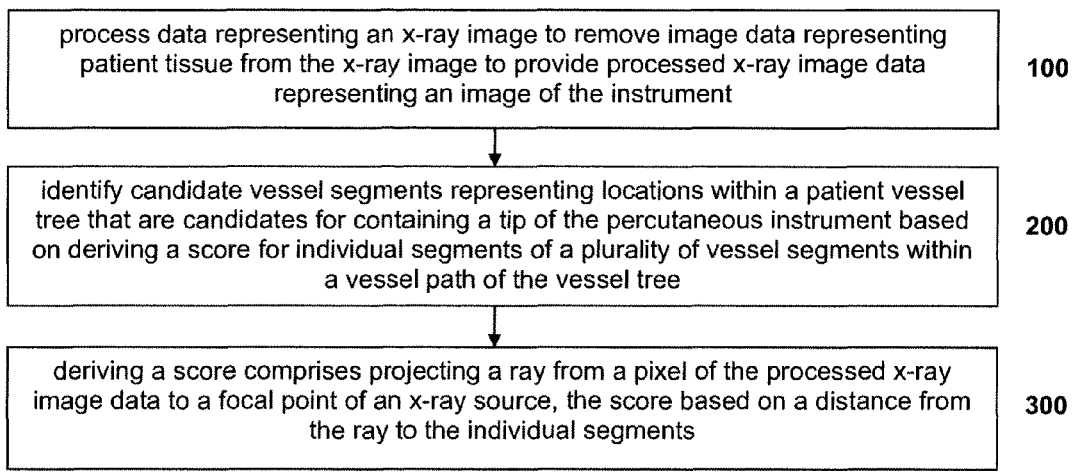
FIGS. 2A-2K are flow charts illustrating the disclosed process performed by the system of FIG. 1.
Figure 2B:
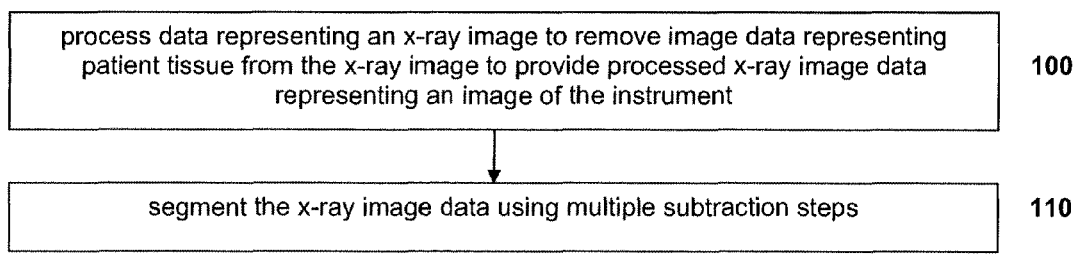
Figure 2C:
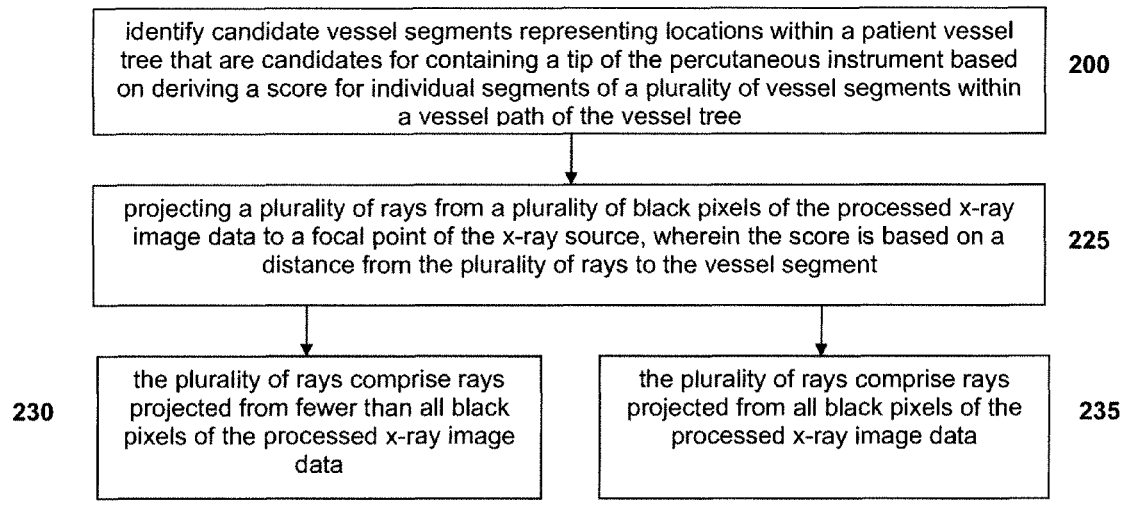
Figure 2D:
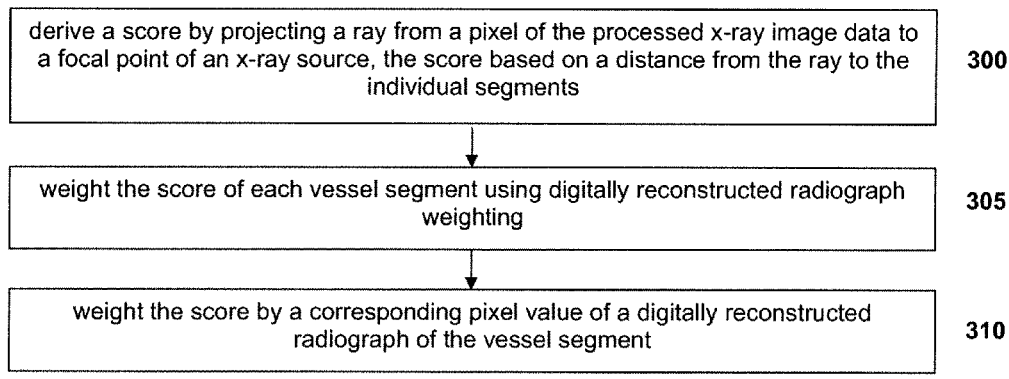
Figure 2E:
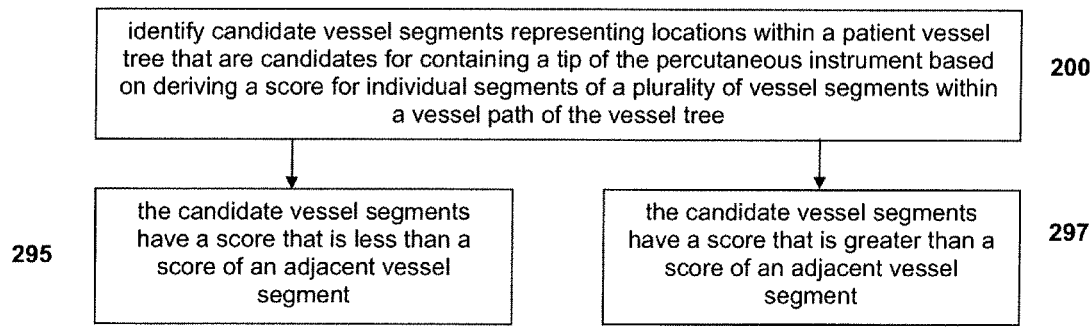
Figure 2F:
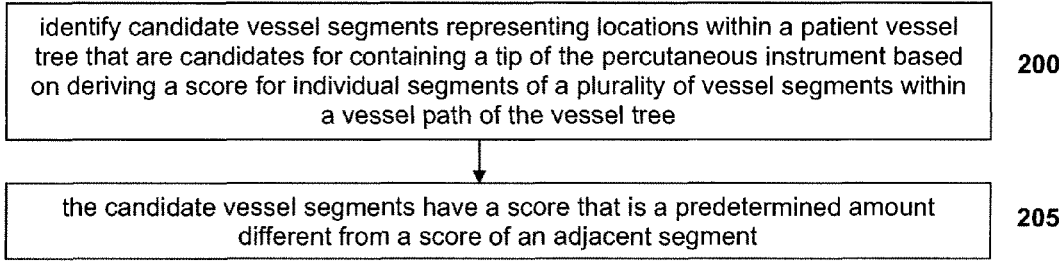

Referring to FIG. 2A, at step 100, data representing the x-ray image is processed to remove image data representing patient tissue from the x-ray image to provide processed x-ray image data representing an image of the instrument. This step removes images of patient tissue (e.g., bone tissue, soft tissue) from the x-ray image and results in a processed x-ray image that contains an image of the instrument. In one embodiment, at step 110 (FIG. 2B) this processing comprises segmenting the x-ray image using multiple subtraction steps. The x-ray image is segmented to eliminate background features (e.g., bone tissue, soft tissue) and to increase the image contrast of the instrument, resulting in an image that stands out clearly from the background.

In one embodiment, this segmentation includes multiple subtraction steps in which multiple fluoroscopic images are successively obtained and subtracted from each other to obtain a fluoroscopic image that emphasizes the instrument and minimizes or eliminates background features. Since the multiple subtraction steps result in a relatively noisy image, the resulting subtracted instrument image is binarized using a threshold. In one embodiment, this threshold assigns a "0" to pixels having lower than a certain illumination value, and assigning a "1" to pixels having a higher than a certain illumination value. The threshold value should be high enough that the instrument is completely shown in the resulting image, and low enough that the number of black pixels (i.e., those representing the instrument) is minimized so as to minimize overall computation time. The threshold value is not critical and the process will work well for a relatively large range of threshold values.

An exemplary resultant segmented and binarized fluoroscopic image 30 is shown in FIG. 3. As previously noted, the resultant image is noisy, but it contains a clear image of the instrument 32 without other background features.

At step 200 (FIG. 2A), candidate vessel segments are identified. These candidate vessel segments represent locations within the patient vessel tree that are candidates for containing a tip of the percutaneous instrument based on deriving a score for individual segments of a plurality of vessel segments within a vessel path of the vessel tree. Deriving a score comprises, at step 300, projecting a ray from a black pixel of the processed x-ray image data to a focal point of the x-ray source, where the score is based on a distance from the ray to the individual vessel segments.

FIG. 3 shows a ray from a black pixel of the processed x-ray image 30 projected to a focal point 34 of the x-ray source 2. This step, referred to as "back-projecting" is performed by casting rays 36 from the black pixels of the subtracted and binarized fluoroscopic image 30 back to the focal point 34. This back-projection occurs in the context of the vessel tree 38, since the fluoroscopic image 30 and the vessel tree volume are co-registered. In this way, the system 1 determines how close each cast ray comes to the vessel tree. In one embodiment, backprojection is performed for each black pixel of the subtracted and binarized fluoroscopic image 30, and includes noise pixels as well as instrument pixels. In another embodiment, backprojection is performed for fewer than all black pixels of the image 30.

The plurality of vessel paths of the patient vessel tree 38 are divided into a plurality of vessel segments. In one embodiment, the vessel segments comprise a multiplicity of short (e.g., 1 centimeter), non-overlapping segments. In one embodiment, the plurality of vessel segments connect a common vessel root (e.g., the carotid artery) to a vessel endpoint. As previously noted, at steps 200 and 300 (FIG. 2A) a score is assigned to the plurality of vessel segments based on the distance between the projected rays and the particular vessel segment. Thus, for a vessel segment and for a ray 36, the point 40 (see FIG. 3) on the ray that represents the shortest distance from that ray to the particular vessel segment is determined. A score is applied to that segment based on the distance from the point 40 to the segment. In one embodiment the score is selected so that it decreases exponentially with increasing distance from the vessel segment. The rays/points that are closest to a particular segment (i.e., those of most interest) contribute a high score to that segment, while more distant rays/points contribute a substantially lower score to the segment.

In one embodiment, fewer than all rays are considered when performing vessel segment scoring. Thus, at step 225 (FIG. 2C), a plurality of projected rays are projected from a plurality of black pixels of the processed x-ray image data to the focal point 34 (FIG. 3) of the x-ray source 2, the score being based on a distance from the plurality of rays to the vessel segment. In one embodiment (step 230), the plurality of rays comprise rays projected from fewer than all black pixels of the processed x-ray image data. For example, those rays that pass within a predetermined distance from a particular vessel segment are considered, with other rays disregarded. In one particular embodiment, the predetermined distance is dependent upon the size of the particular vessel segment (e.g., about 3 times the diameter of the vessel segment). In another embodiment, the predetermined distance is the same for the segments (e.g., 3 centimeters). In further embodiments all rays are considered when performing the vessel segment scoring. Thus, at (step 235), the plurality of rays comprise rays projected from all black pixels of the processed x-ray image data.

A running score count is kept for the segments in the vessel tree. As will be appreciated, a vessel segment that is close to the backprojected instrument pixels has a relatively high score due to the high density of pixels associated with the instrument represented in the fluoroscopic image. Noise pixels, on the other hand, are more dilute and evenly distributed across the fluoroscopic image 30, and thus, for vessel segments that are close (and away from the instrument), the running count for those segments is relatively low.

Figure 4:
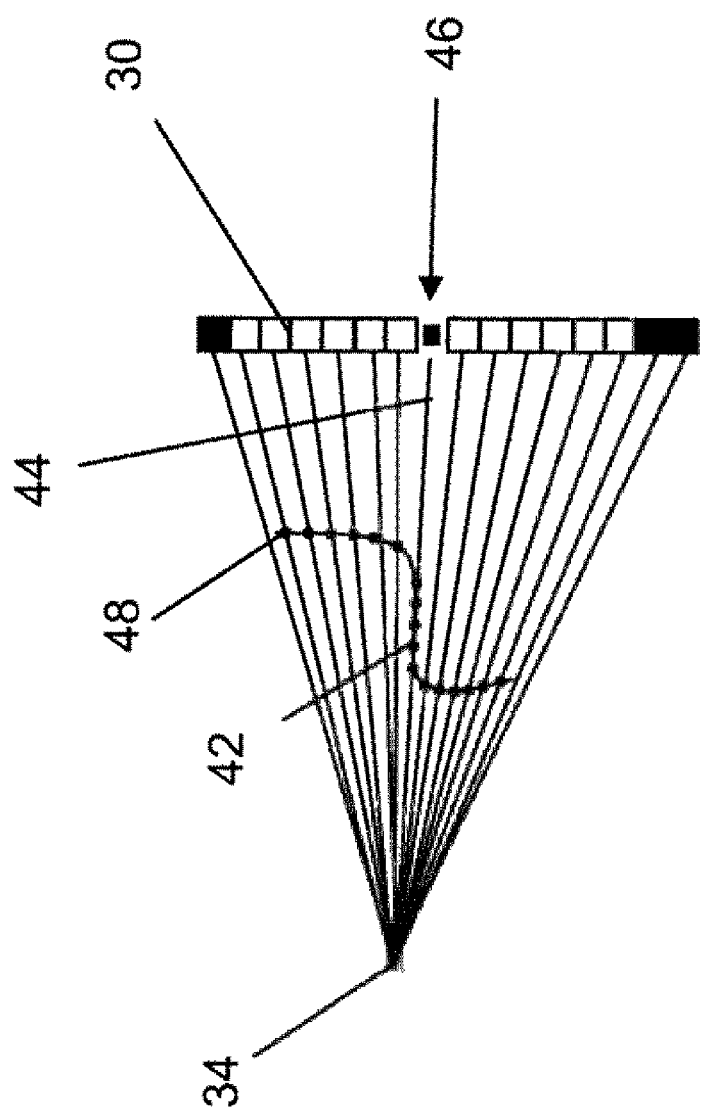
FIG. 4 is an image representing a digitally reconstructed radiograph of a vessel path of a vessel tree.
Figure 5:
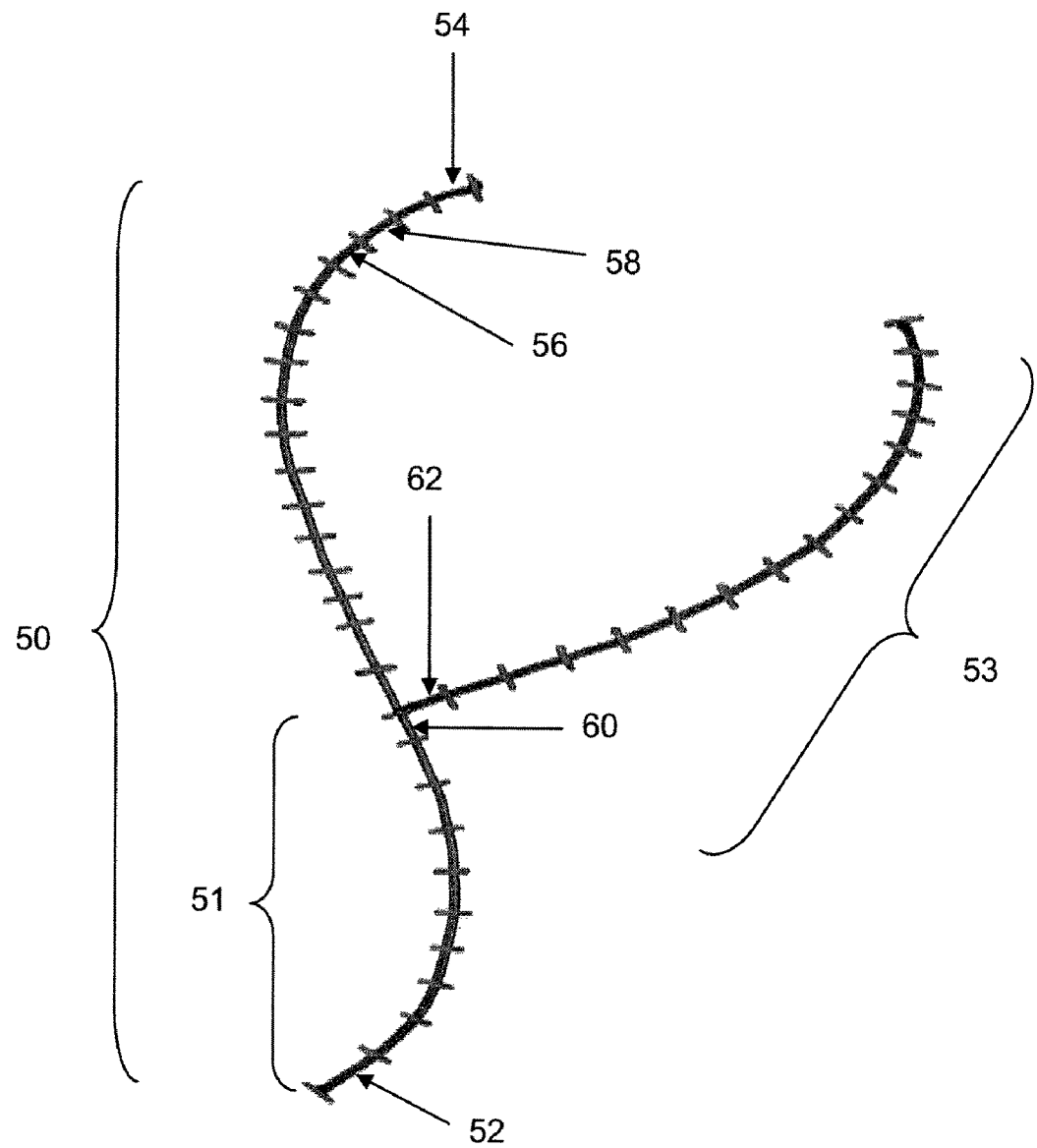
FIG. 5 is a representation of multiple vessel segments making up vessel paths of the vessel tree shown in FIG. 3.

In some embodiments, vessel segment weighting is performed to compensate for the instrument's variable footprint in different orientations. FIG. 4 shows an exemplary plurality of vessel segments 42 that are coincidentally oriented along a single ray 44. With the scoring process of step 400, these vessel segments 42 are assigned a relatively low score because they are directly aligned with a single black instrument pixel 46 of the fluoroscopic image 30, despite the fact that they correspond highly with the instrument image. Such a low score may not be accurately indicative of the superior correlation between the vessel segments and the ray, and therefore, weighting may be applied to compensate.

In one embodiment, at step 305 (FIG. 2D), the scores of the vessel segments are weighted using digitally reconstructed radiograph (DRR) weighting. At step 310, the DRR weighting process weights the score for the vessel segment obtained at step 200 (FIG. 2A) by the corresponding pixel value of a DRR of that vessel segment. The DRR of the vessel segment is a 2D projection (taken to the x-ray focal point 34 of the x-ray source 2) of the portion of the 3D volume that contains the vessel segment. The resulting DRR represents a "density" of the vessel segment in the projection direction, so that those segments that are oriented parallel to the projection direction (i.e., ray 44) are emphasized, creating a higher DRR pixel value (e.g., black=low, white=high) than those vessel segments 48 oriented orthogonal to the projection direction. The DRR pixel value is applied to the score from step 200 to obtain weighted scores for the vessel segments of the vessel tree 38.

Vessel segments are identified that have a high likelihood of containing the instrument tip. As previously noted, the patient vessel tree comprises a plurality of vessel paths 50, 51, 53 (FIG. 5), in which a vessel path 50 consists of a plurality of vessel segments that connect a vessel root (segment #1, 52) to an endpoint (segment #n, 54) (see FIG. 5). For the possible paths 50, 51, 53 etc. a one-dimensional function is obtained by plotting a segment's number (x-axis) against its weighted score (y-axis) from step 500. Low-pass filtering may be applied to the one-dimensional path function to obtain a smoother variation in scores, since many factors (e.g., noise, misalignment) can cause a brief drop in score. It is assumed that a prolonged drop in score signals the end of the instrument (i.e., the instrument tip) if it is indeed in the current vessel segment.

If it is assumed that the instrument is contained at least in segment #1, 52 (defined, in one embodiment, as the carotid artery, through which the instrument necessarily passes to reach the vasculature of the brain), the vessel path function starts with a relatively high score, which eventually drops to a low score, assuming the tip of the instrument hasn't reached the end of the vessel path. Thus, at step 800, candidate vessel segments are identified as those having a score that is a predetermined amount different from a score of an adjacent vessel segment.

In one embodiment, at step 295 (FIG. 2E) the candidate vessel segments have a score that is less than a score of an adjacent vessel segment. Alternatively, at step 297, the candidate vessel segments have a score that is greater than a score of an adjacent vessel segment.

The difference in scores can be determined, for example, at step 205 (FIG. 2F) by identifying instances in which the weighted score of vessel segment "i"(identified as 56 in FIG. 5) of the vessel path 50 is a predetermined amount (e.g., 50%) different than the weighted score of vessel segment "i+1 (identified as 58 in FIG. 5) of the vessel path 50. Where such score changes are identified, vessel segments along the vessel path 50 from segment #1 (52) to segment #i (56) are stored as candidate vessel paths for containing the instrument.

At step 210 (FIG. 2G), candidate vessel paths are identified as those paths that contain candidate vessel segments. The list of candidate vessel paths is refined by eliminating errant candidate vessel paths from the list of candidate vessel paths identified in step 210. Errant candidate vessel paths are those that contain a vessel segment that meets the criteria of step 200 (FIG. 2A) or step 205 (FIG. 2F) (e.g., the segment has a score that is a predetermined amount different from a score of an adjacent vessel segment), but which do not contain the instrument. This occurs where multiple vessel paths 50, 51 share common vessel segments.

Thus, at step 215 (FIG. 2G), the list of candidate vessel paths is refined by eliminating candidate vessel path that shares vessel segments with another candidate vessel path (i.e., the shorter of the two paths is eliminated). For example, in FIG. 5 vessel paths 50 and 51 share vessel segments 52 through 60. According to the example and criteria of step 200 or 205 (FIGS. 2A, 2F), if the instrument is located within vessel segment 56, vessel segment 60 is assigned a high score, while vessel segment 62 is assigned a low score. This analysis can lead to the erroneous conclusion that the instrument tip is located within vessel path 51 at vessel segment 60, though the drop in score is actually indicative of a branch in the vessel tree rather than the presence of the instrument tip.

As noted, such errant paths can be detected and eliminated by determining whether the candidate vessel path is completely contained within another candidate vessel path, and eliminating the shorter path from the list of candidates. Referring to the example of FIG. 5, vessel path 51 is completely contained within vessel path 50, and thus at step 800 vessel path 51 is concluded to be an errant candidate vessel path, and is eliminated from further consideration as containing the instrument.

Figure 2G:
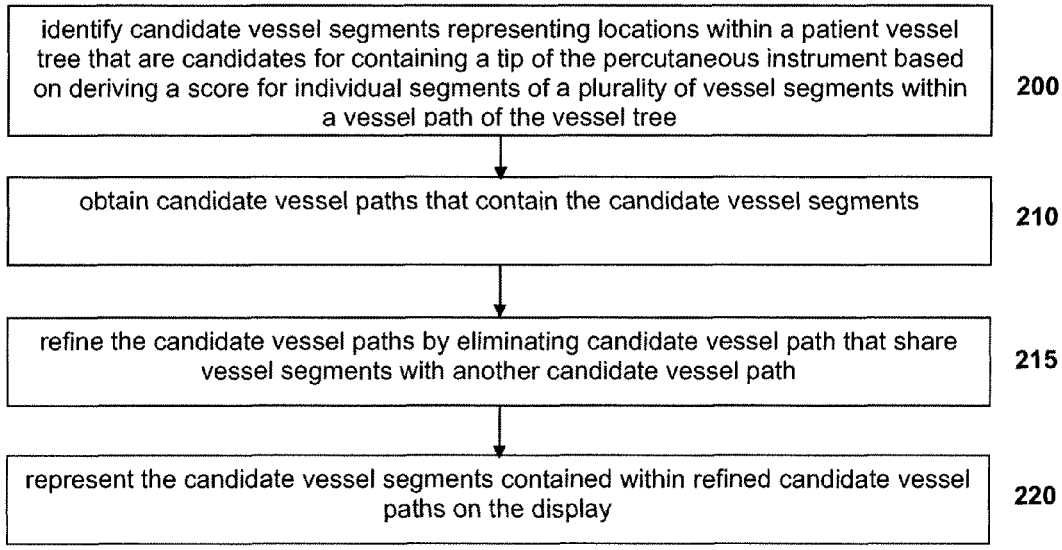
Figure 2H:
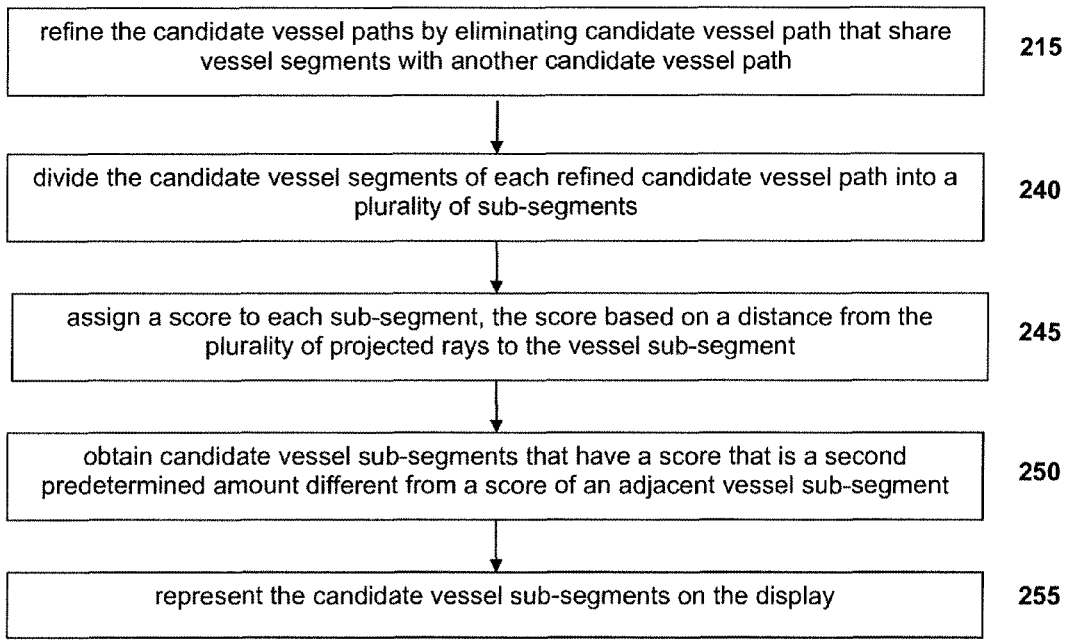
Figure 2I:
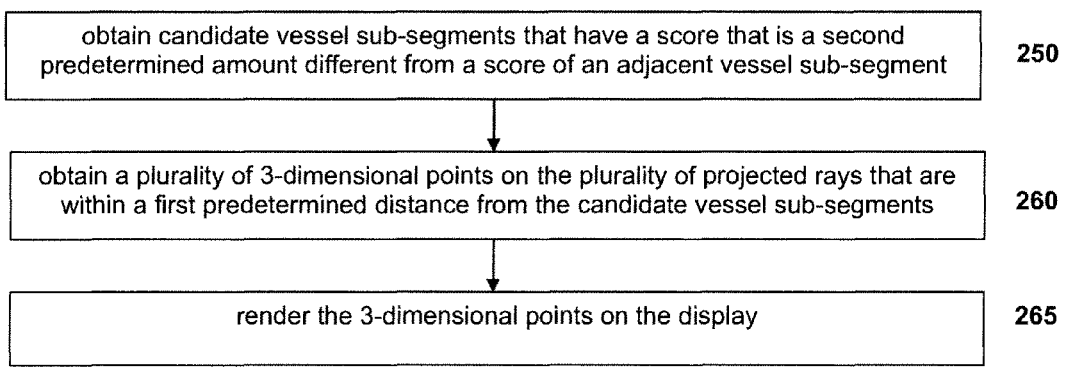
Figure 2J:
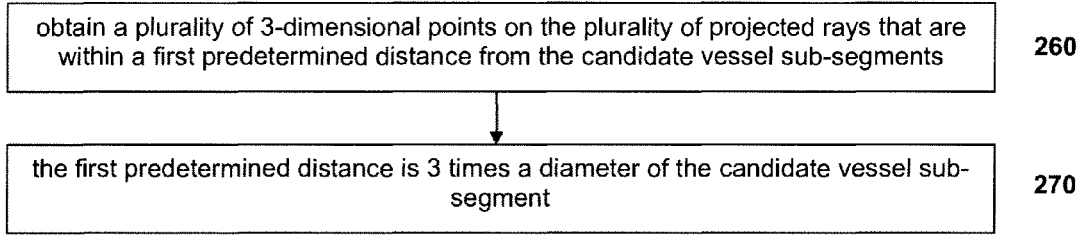
Figure 2K:
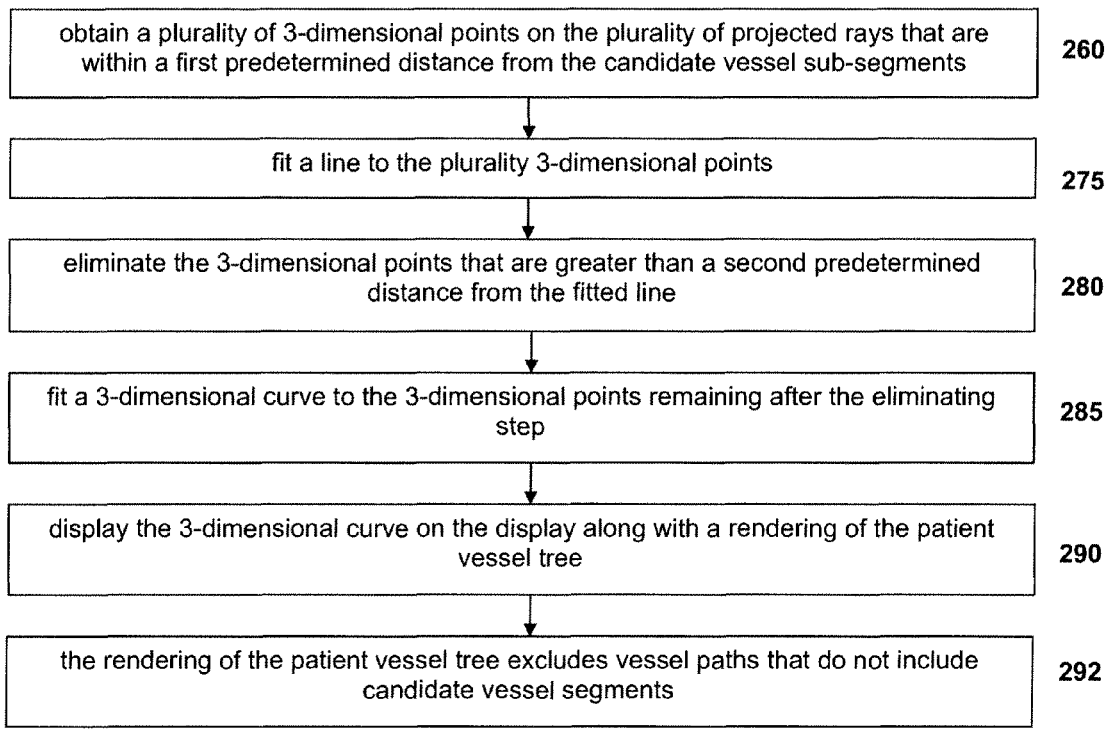

The candidate vessel segments contained within refined candidate vessel paths may be displayed on the display 28 at step 220 (FIG. 2G). The refined candidate vessel segments represent locations within the vessel tree that are candidates for containing the tip of the percutaneous instrument.

A further refinement step is performed to more precisely define the tip of the instrument within the vessel tree. Thus, at step 240 (FIG. 2H), the candidate vessel segments of the refined candidate vessel path are divided into a plurality of sub-segments (e.g., 1 millimeter or less). At step 245, scores are assigned to the sub-segments, where sub-segment score is based on a distance from the projected rays to the particular vessel sub-segment. At step 250, a list of candidate vessel sub-segments is obtained that have a score that is a second predetermined amount different from a score of an adjacent vessel sub-segment. In one embodiment, the second predetermined amount (i.e., the amount by which the scores of adjacent vessel sub-segments differ) is 50%. At step 255, the candidate vessel sub-segments are represented on the display 28.

The candidate vessel sub-segments are displayed to the user as having a different color or other graphical distinguishing characteristic than the remainder of the vessel segments in the vessel tree. Alternatively, the portion of the vessel tree in the vicinity of the candidate vessel segments (i.e., a certain defined distance upstream and downstream from the candidate vessel segments) is rendered and displayed to the user to provide the user with a clearer view of the relevant portions of the vessel tree. This is referred to as "pruning," in which the system eliminates from further renderings those vessel paths that are not determined to be candidate vessel paths. In this step the live fluoroscopic image can also be overlaid on top of the rendered and "pruned" vessel tree.

Based on the information provided to the user in step 255 (FIG. 2H), the user makes an educated guess about which vessel segment (and thus which vessel path) contains the instrument tip. As a result, further processing is not required. In other instances, however, it is desirable to provide a direct visualization of the instrument in the context of the vessel tree, and more particularly in the context of the vessels in which the instrument resides and the vessels adjacent to the instrument.

Section 2—3D Guidewire Visualization

The candidate vessel segments and scores of refined candidate paths resulting from step 250 (FIG. 2H) are obtained and thresholding is performed. Thus, for the candidate vessel segments of a final candidate path, those 3D points (on the previously described backprojected rays) that are within certain predetermined distance from the candidate vessel sub-segments are considered further. Thus, at step 260 (FIG. 2I), 3D points on the projected rays that are within a first predetermined distance from the candidate vessel sub-segments are obtained. These 3D points are rendered on the display 28 at step 265. This rendering is shown in FIG. 3, with the light grey shading representing those 3D points that are located a greater distance from the candidate vessel sub-segments than the predetermined threshold distance, while the dark grey shading represents those 3D points located within the predetermined threshold distance.

In one exemplary embodiment (step 270 (FIG. 2J), the threshold is selected so that the first predetermined distance is three times a diameter of the vessel sub-segment (i.e., 3D points farther away than three times the diameter are disregarded).

Figure 6:
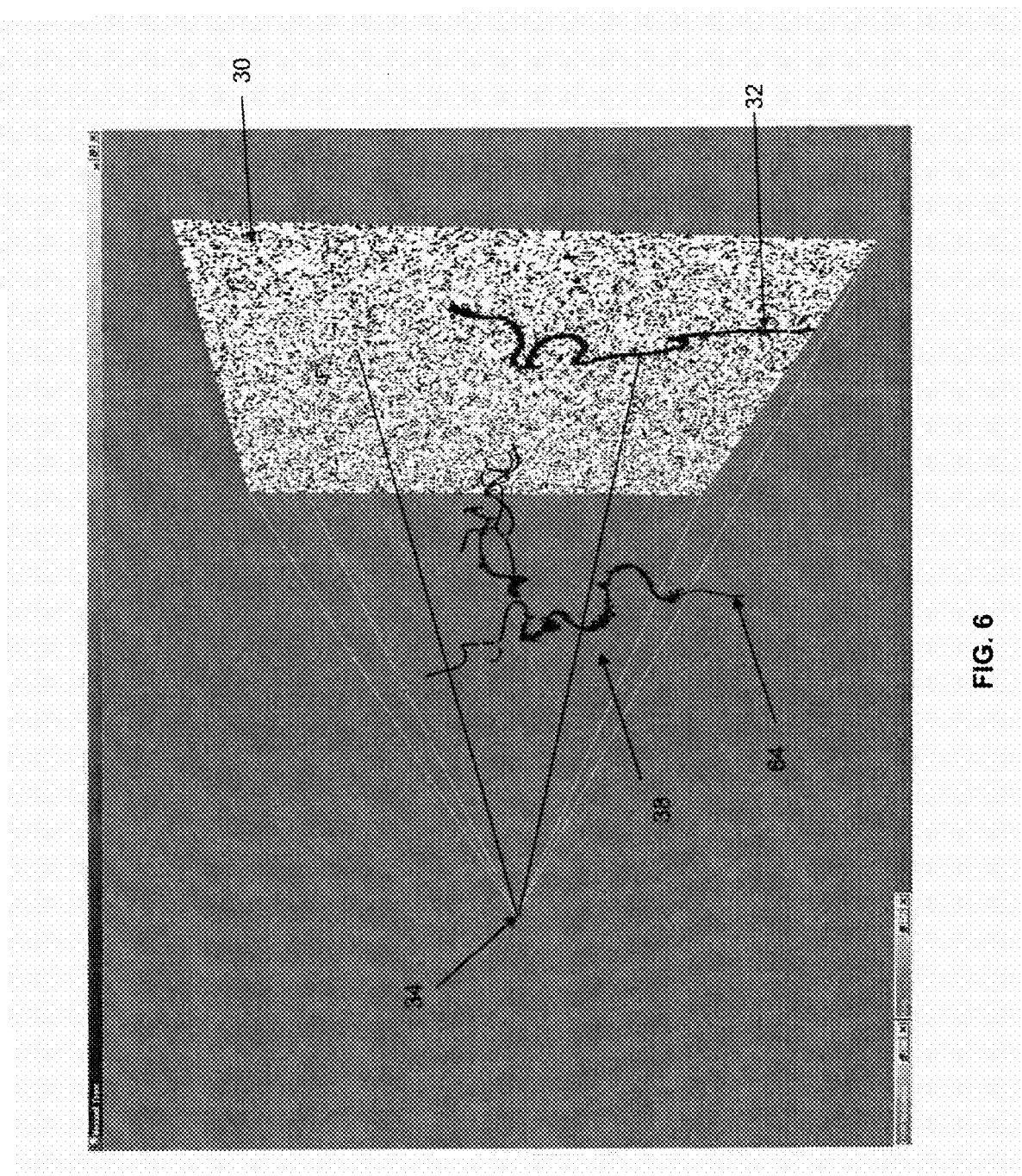
FIG. 6 is a representation of FIG. 3 in which thresholding has been applied to the 2D black pixels backprojected onto the 3D vessel tree.

Visualization is performed, in which the remaining 3D points (i.e., those that have survived thresholding) are rendered on the display 28 for viewing by the user. This is shown in FIG. 6. Since the 3D points of rays from instrument pixels are stable over time, and are close to one another, they appear as a dense string of points in 3D, and are shown roughly surrounding vessel path 64 of the vessel tree 38. Conversely, 3D points corresponding to noise pixels fluctuate over time and are randomly dispersed. As a result, the position of the instrument, though somewhat rough, can be clearly recognized by the user. The illustration of FIG. 6 shows the vessel tree rendered in a "pruned" condition, where the most relevant vessel paths are displayed for viewing.

The user employs the visual information provided in step 265 (FIG. 2I) to determine the location of the instrument tip within the patient, and thus, in some embodiments further processing is not required. In other instances, however, it may be desirable to provide the user with a 3D representation of the instrument and the associated vessel path in which the instrument resides.

Section 3—3D Guidewire Reconstruction

Candidate vessel segments and their corresponding 3D points (i.e., the 3D points from rays that reside within the predetermined threshold distance from the vessel segments), produced at step 260 (FIG. 2I), are obtained. At step 275 (FIG. 2K), a line is fit to the plurality of 3-D points associated with a given segment. In one embodiment, this is done by minimizing, using least squares, the sum of the shortest distances between the line and the 3D points. Segmentation is performed, in which those points within a certain distance from the fitted line are considered, and the 3-D points that are greater than a second predetermined distance from the fitted line are eliminated (step 280). This segments the instrument pixels from the noise pixels. At step 285, a 3D curve is fit to the 3D points remaining after the eliminating step. This 3D curve is a geometric representation of the instrument, and is done as an approximation by line segments or as a B-spline, to result in a smooth representation of the instrument. The output is a geometric curve, and thus the instrument is no longer defined as pixels. It is an estimation of the location of the instrument in 3D space. At step 290, the 3D curve is displayed on the display 28, along with a rendering of the patient vessel tree. In one embodiment, at step 292, the rendering of the patient vessel tree excludes vessel paths that do not include candidate vessel segments (i.e., the vessel tree is shown in a "pruned" condition.

Figure 7:
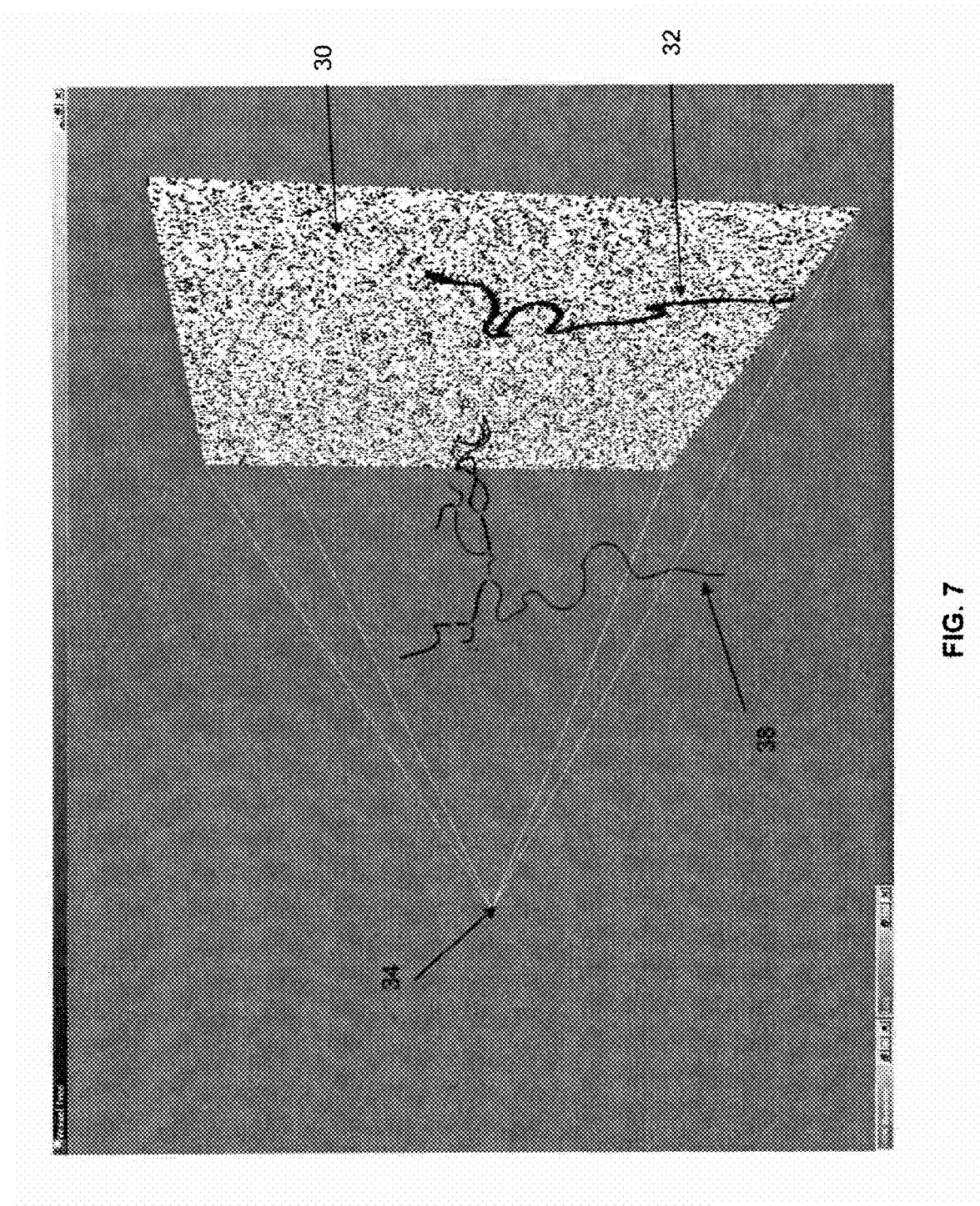
FIG. 7 is a 3D representation of the instrument in the context of the 3D vessel tree of FIG. 3.

As shown in FIG. 7, the resulting 3D representation of the instrument is displayed to the user, along with a rendering of the vessel tree in the "pruned" condition, showing the most relevant vessel paths for viewing.

By providing this 3D representation of the instrument in the context of the vessel tree, the user can rotate the 3D image of the vessel tree and instrument without having to move the C-arm 4 to obtain further fluoroscopic images. This enables the user to find an optimal angle to visualize the instrument in the context of the vessel tree. Thus, the user can select a desired orientation by rotating the 3D vessel tree, and the 3D image of the instrument is generated without having to move the C-arm.

The method described herein may be automated by, for example, tangibly embodying a program of instructions upon a computer readable storage media capable of being read by machine capable of executing the instructions. A general purpose computer is one example of such a machine. A non-limiting exemplary list of appropriate storage media well known in the art would include such devices as a readable or writeable CD, flash memory chips (e.g., thumb drives), various magnetic storage media, and the like.

The features of the method have been disclosed, and further variations will be apparent to persons skilled in the art. Such variations are considered to be within the scope of the appended claims. Reference should be made to the appended claims, rather than the foregoing specification, as indicating the true scope of the disclosed method.

The functions and process steps herein may be performed automatically or wholly or partially in response to user command. An activity (including a step) performed automatically is performed in response to executable instruction or device operation without user direct initiation of the activity.

The systems and processes of FIGS. 1-7 are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. The processes and applications may, in alternative embodiments, be located on one or more (e.g., distributed) processing devices accessing a network linking the elements of FIG. 1. Further, the functions and steps provided in FIGS. 2A-K may be implemented in hardware, software or a combination of both and may reside on one or more processing devices located at a location of a network linking the elements of FIG. 1 or another linked network, including the Internet.

The invention claimed is:

1. A method for locating a percutaneous instrument in three dimensional image representative data for use in an imaging system, comprising:
processing data representing an x-ray image to remove image data representing patient tissue from the x-ray image to provide processed x-ray image data representing an image of the instrument; and
identifying candidate vessel segments representing locations within a patient vessel tree that are candidates for containing a tip of the percutaneous instrument based on deriving a score for individual segments of a plurality of vessel segments within a vessel path of the vessel tree;
wherein the step of deriving a score comprises projecting a ray from a pixel of the processed x-ray image data to a focal point of an x-ray source, the score based on a distance from the ray to the individual segments.

2. The method of claim 1, wherein the candidate vessel segments have a score that is a predetermined amount different from a score of an adjacent segment.

3. The method of claim 1, further comprising:
obtaining candidate vessel paths that contain the candidate vessel segments;
refining the candidate vessel paths by eliminating candidate vessel path that share vessel segments with another candidate vessel path; and
representing the candidate vessel segments contained within refined candidate vessel paths on the display.

4. The method of claim 3, wherein the identifying step comprises projecting a plurality of rays from a plurality of pixels of the processed x-ray image data to a focal point of the x-ray source, wherein the score is based on a distance from the plurality of rays to the vessel segment.

5. The method of claim 4, wherein the plurality of rays comprise rays projected from fewer than all black pixels of the processed x-ray image data.

6. The method of claim 4, wherein the plurality of rays comprise rays projected from all black pixels of the processed x-ray image data.

7. The method of claim 4, further comprising, after the refining step, the steps of:
dividing the candidate vessel segments of each refined candidate vessel path into a plurality of sub-segments;
assigning a score to each sub-segment, the score based on a distance from the plurality of projected rays to the vessel sub-segment; and
obtaining candidate vessel sub-segments that have a score that is a second predetermined amount different from a score of an adjacent vessel sub-segment;
wherein the representing step comprises representing the candidate vessel sub-segments on the display.

8. The method of claim 7, further comprising:
obtaining a plurality of 3-dimensional points on the plurality of projected rays that are within a first predetermined distance from the candidate vessel sub-segments; and
rendering the 3-dimensional points on the display.

9. The method of claim 8, wherein the first predetermined distance is 3 times a diameter of the candidate vessel sub-segment.

10. The method of claim 9, further comprising:
fitting a line to the plurality 3-dimensional points,
eliminating the 3-dimensional points that are greater than a second predetermined distance from the fitted line;
fitting a 3-dimensional curve to the 3-dimensional points remaining after the eliminating step; and
displaying the 3-dimensional curve on the display along with a rendering of the patient vessel tree.

11. The method of claim 10, wherein the rendering of the patient vessel tree excludes vessel paths that do not include candidate vessel segments.

12. The method of claim 1, wherein the step of processing comprises segmenting the x-ray image data using multiple subtraction steps.

13. The method of claim 1, wherein the candidate vessel segments have a score that is greater than a score of an adjacent vessel segment.

14. The method of claim 1, wherein the candidate vessel segments have a score that is less than a score of an adjacent vessel segment.

15. The method of claim 1, further comprising, after the step of deriving a score for individual segments, weighting the score of each vessel segment using digitally reconstructed radiograph weighting.

16. The method of claim 15, wherein the step of weighting the score of each vessel segment comprises weighting the score by a corresponding pixel value of a digitally reconstructed radiograph of the vessel segment.

17. A system for locating a percutaneous instrument in three dimensional image representative data for use in a system comprising an imaging system having a movable arm, an x-ray source and an x-ray detector and a display and a system controller connected to and in communication with the imaging system and display, and a machine-readable storage medium encoded with a computer program code such that, when the computer program code is executed by a processor, the processor performs a method comprising:
   processing data representing an x-ray image to remove image data representing patient tissue from the x-ray image to provide processed x-ray image data representing an image of the instrument; and
   identifying candidate vessel segments representing locations within a patient vessel tree that are candidates for containing a tip of the percutaneous instrument based on deriving a score for individual segments of a plurality of vessel segments within a vessel path of the vessel tree;
   wherein the step of deriving a score comprises projecting a ray from a pixel of the processed x-ray image data to a focal point of an x-ray source, the score based on a distance from the ray to the individual segments.

18. The system of claim 17, wherein the candidate vessel segments have a score that is a predetermined amount different from a score of an adjacent segment.

19. The system of claim 17, wherein the method performed by the processor further comprises:
   obtaining candidate vessel paths that contain the candidate vessel segments;
   refining the candidate vessel paths by eliminating candidate vessel path that share vessel segments with another candidate vessel path; and
   representing the candidate vessel segments contained within refined candidate vessel paths on the display.

20. The system of claim 19, wherein the identifying step comprises projecting a plurality of rays from a plurality of pixels of the processed x-ray image data to a focal point of the x-ray source, wherein the score is based on a distance from the plurality of rays to the vessel segment.

21. The system of claim 20, wherein the plurality of rays comprise rays projected from fewer than all black pixels of the processed x-ray image data.

22. The system of claim 20, wherein the plurality of rays comprise rays projected from all black pixels of the processed x-ray image data.

23. The system of claim 20, wherein the method performed by the processor further comprises, after the refining step, the steps of:
   dividing the candidate vessel segments of each refined candidate vessel path into a plurality of sub-segments;
   assigning a score to each sub-segment, the score based on a distance from the plurality of projected rays to the vessel sub-segment; and
   obtaining candidate vessel sub-segments that have a score that is a second predetermined amount different from a score of an adjacent vessel sub-segment;
   wherein the representing step comprises representing the candidate vessel sub-segments on the display.

24. The system of claim 23, wherein the method performed by the processor further comprises:
   obtaining a plurality of 3-dimensional points on the plurality of projected rays that are within a first predetermined distance from the candidate vessel sub-segments; and
   rendering the 3-dimensional points on the display.

25. The system of claim 24, wherein the first predetermined distance is 3 times a diameter of the candidate vessel sub-segment.

26. The system of claim 25, wherein the method performed by the processor further comprises:
   fitting a line to the plurality 3-dimensional points,
   eliminating the 3-dimensional points that are greater than a second predetermined distance from the fitted line;
   fitting a 3-dimensional curve to the 3-dimensional points remaining after the eliminating step; and
   displaying the 3-dimensional curve on the display along with a rendering of the patient vessel tree.

27. The system of claim 26, wherein the rendering of the patient vessel tree excludes vessel paths that do not include candidate vessel segments.

28. The system of claim 17, wherein the step of processing comprises segmenting the image using multiple subtraction steps.

29. The system of claim 17, wherein the candidate vessel segments have a score that is greater than a score of an adjacent vessel segment.

30. The system of claim 17, wherein the candidate vessel segments have a score that is less than a score of an adjacent vessel segment.

31. The system of claim 17, wherein the method performed by the processor further comprises, after the step of deriving a score for individual segments, weighting the score of each vessel segment using digitally reconstructed radiograph weighting.

32. The system of claim 31, wherein the step of weighting the score of each vessel segment comprises weighting the score by a corresponding pixel value of a digitally reconstructed radiograph of the vessel segment.

* * * * *